United States Patent
Brunner Plenge

(10) Patent No.: US 11,945,624 B2
(45) Date of Patent: Apr. 2, 2024

(54) BOTTLE CLOSURE ASSEMBLY FOR EFFICIENT PRODUCTION OF SPARKLING WINE

(71) Applicant: Paula Rosamond Brunner Plenge, North Vancouver (CA)

(72) Inventor: Paula Rosamond Brunner Plenge, North Vancouver (CA)

(73) Assignee: Paula Rosamond Brunner Plenge (CA)

( * ) Notice: Subject to any disclaimer, the term of this patent is extended or adjusted under 35 U.S.C. 154(b) by 3 days.

(21) Appl. No.: 17/614,971

(22) PCT Filed: Apr. 15, 2020

(86) PCT No.: PCT/EP2020/060555
§ 371 (c)(1),
(2) Date: Nov. 29, 2021

(87) PCT Pub. No.: WO2020/239316
PCT Pub. Date: Dec. 3, 2020

(65) Prior Publication Data
US 2022/0234788 A1    Jul. 28, 2022

(30) Foreign Application Priority Data
May 30, 2019  (GB) .................................... 1907625

(51) Int. Cl.
*B65D 39/00* (2006.01)
*B65D 51/24* (2006.01)
(Continued)

(52) U.S. Cl.
CPC ......... *B65D 39/0052* (2013.01); *B65D 51/24* (2013.01); *B65D 53/02* (2013.01); *C12G 1/064* (2013.01); *C12G 1/08* (2013.01)

(58) Field of Classification Search
CPC .... B65D 39/00; B65D 39/06; B65D 39/0076; B65D 47/30; B65D 51/24; B65D 53/02; C12G 1/064; C12G 1/06; C12G 1/08
(Continued)

(56) References Cited

U.S. PATENT DOCUMENTS 184,908 A * 11/1876 Root ..................... B65D 47/265
215/313
708,749 A * 9/1902 Wilson ................... B65D 49/06
215/23
(Continued)

FOREIGN PATENT DOCUMENTS

CN   109051272 A * 12/2018  ......... B65D 39/0052
DE   813986 C     9/1951
(Continued)

OTHER PUBLICATIONS

Examination Report in counterpart United Kingdom Patent Application No. 1907625.6 dated Sep. 16, 2022.
(Continued)

*Primary Examiner* — Robert J Hicks
(74) *Attorney, Agent, or Firm* — Kim IP Law Group LLC

(57) ABSTRACT

This invention relates to a bottle closure assembly (10) for use in the efficient production of sparkling wines. The invention comprises: a stopper (12) for sealing engagement within the finish and/or neck portion(s) of a bottle (100); a passage (18) within said stopper extending longitudinally from a wine-side opening (20) at one end thereof; and a valve member (30) located within said passage. The valve member is selectively gravity-responsive thus allowing passage of liquid and/or solid and/or gaseous materials to be permitted or prevented dependent upon the orientation of the
(Continued)

bottle closure assembly. This invention also discloses a disgorgement method for use in the production of sparkling wines.

19 Claims, 4 Drawing Sheets

(51) Int. Cl.
*B65D 53/02* (2006.01)
*C12G 1/06* (2019.01)
*C12G 1/073* (2006.01)
*C12G 1/08* (2006.01)

(58) Field of Classification Search
USPC .............. 215/313, 312, 311, 307, 364, 355; 220/203.21, 203.2, 203.19, 804, 806, 801
See application file for complete search history.

(56) References Cited

U.S. PATENT DOCUMENTS

| | | | |
|---|---|---|---|
| 1,859,362 A | 5/1932 | Grauman et al. | |
| 1,908,975 A | 5/1933 | Grauman et al. | |
| 3,782,608 A * | 1/1974 | Schneider | B65D 83/0409 221/266 |

FOREIGN PATENT DOCUMENTS

| | | |
|---|---|---|
| DE | 3902280 A1 | 9/1989 |
| DE | 3821512 A1 | 12/1989 |
| DE | 102009040025 A1 | 3/2011 |
| EP | 3135361 A1 | 3/2017 |
| GB | 487296 A | 6/1938 |
| IT | TV20110094 A1 | 1/2013 |
| WO | WO-2005049442 A1 * | 6/2005 ............ B65D 39/06 |
| WO | 2009/012531 A1 | 1/2009 |
| WO | 2009012531 A1 | 1/2009 |

OTHER PUBLICATIONS

UK Search Report in UK Application No. GB1907625.6.
International Search Report for PCT Application PCT/EP2020/060555, dated Jul. 7, 2020.
Written Opinion for PCT Application PCT/EP2020/060555, dated Jul. 7, 2020.

\* cited by examiner

BOTTLE CLOSURE ASSEMBLY FOR EFFICIENT PRODUCTION OF SPARKLING WINE

The present invention relates to a bottle closure assembly facilitating the efficient production of sparkling wines including, but not limited to, Champagne and Cava. In particular, the invention provides a re-usable bottle closure assembly allowing producers of sparkling wines to implement the traditional method (known within the Champagne region as the "méthode champenoise"), but with minimal resultant wine and pressure loss inherent in the disgorgement process which follows secondary fermentation. The invention therefore provides improved working conditions for winemakers coupled with significant efficiency gains derived from increased yields and reduced labour costs.

The wastage of wine associated with the disgorgement process is already a recognised problem, but one that has been largely accepted as an unavoidable consequence of the production of sparkling wines whether produced using traditional or artisanal methods, or via mass-production. Nevertheless, some efforts have been made in the past to address this problem. For example, UK patent publication No. GB2541403A discloses a plug member for frictionally engaging the inner neck of a bottle. A longitudinal opening is provided within the plug member within which is located a valve biased into a closed position to seal the opening. In use, a sediment which collects within the neck of an inverted bottle can be ejected by manually opening the valve and allowing pressure within the bottle to escape, carrying with it the spent yeast.

However, in recognition of the fact that prior art devices are unable to perform the disgorgement process in a fully controlled and safe manner, the inventor of the present invention has devised an alternative bottle closure which overcomes, or at least ameliorates those shortcomings.

According to a first aspect of the present invention there is provided a bottle closure assembly for use in the efficient production of sparkling wines comprising:
 (i) a stopper for sealing engagement within the finish and/or neck portion(s) of a bottle;
 (ii) a passage within said stopper extending longitudinally from a wine-side opening at one end thereof; and
 (iii) a valve member located within said passage;
wherein the valve member is selectively gravity-responsive thus allowing passage of liquid and/or solid and/or gaseous materials to be permitted or prevented dependent upon the orientation of the bottle closure assembly.

Optionally, the passage comprises an enlarged chamber.

Optionally, the valve member is located within said enlarged chamber remote from said wine-side opening.

Optionally, the valve member is at least partially hollow.

Optionally, the valve member has an exterior surface which is part-spherical.

Optionally, the part-spherical valve member is provided with an opening for permitting or preventing passage of liquid and/or solid and/or gaseous materials into its interior.

Optionally, the valve member is eccentrically weighted and is rotatable relative to the enlarged chamber.

Optionally, the opening has a diameter which is less than the maximum diameter of the part-spherical valve member.

Optionally, the enlarged chamber is substantially spherical in volume and dimensioned such that its internal diameter substantially matches the maximum external diameter of the part-spherical valve member.

Optionally, the part-spherical valve member is seatable against internal walls of the enlarged chamber.

Optionally, the enlarged chamber is defined, in part, by a cap member mounted onto the stopper.

Optionally, an inner surface of the cap member is capable of being moved into, and out of, engagement with the valve member to facilitate said selective rotation relative to the enlarged chamber.

Alternatively, the internal walls are at least partially deformable to selectively engage and disengage the part-spherical valve member to thus respectively prevent or permit its rotation relative to the internal walls of the enlarged chamber.

Optionally, the internal walls of the enlarged internal chamber coincide with a reduced-thickness portion of the stopper.

Optionally, a resiliently deformable gasket is mountable upon an upper shoulder surface of the stopper at a longitudinal position corresponding to the transition from an increased-thickness portion of the stopper to said reduced-thickness portion of the stopper.

Optionally, a downwardly extending annular collar of the cap member is provided with screw-threads engageable with complimentary screw-threads provided on the reduced-thickness portion of the stopper to facilitate the cap member to be rotationally secured to the stopper.

Optionally, the resiliently deformable gasket is locatable within an annular recess on the bottle closure defined by:
 (i) the upper shoulder surface;
 (ii) the underside of the downwardly extending annular collar of the cap member; and
 (iii) an external cylindrical surface of the reduced-thickness portion of the stopper.

Optionally, said selective deformation of the internal walls of the enlarged chamber is achieved by the selective resilient deformation of the deformable gasket arising from the longitudinal position of the annular collar of the cap member relative to the upper shoulder surface of the stopper.

According to a second aspect of the present invention there is provided a disgorgement method for use in the production of sparkling wines, the method comprising:
 (i) providing a bottle closure assembly according to the first aspect;
 (ii) inserting said bottle closure assembly into the finish and/or neck portion(s) of a bottle containing ingredients necessary for initiating secondary fermentation;
 (iii) riddling the bottle whilst it is at least partially inverted;
 (iv) collecting the sediment produced during secondary fermentation within the valve member located within said bottle closure assembly; and
 (v) re-orientating the bottle towards an upright position and causing the gravity-responsive valve member to rotate relative to a said bottle under the influence of gravity and, in so doing, isolate said sediment within the bottle closure assembly for ease of removal.

Optionally, the insertion of the bottle closure assembly to the finish and/or neck portion(s) of the bottle includes engaging it with the exterior neck portion thereof via a clamping member.

Optionally, the valve member is held in a fixed position relative to the stopper during at least riddling of the bottle and collection of the sediment.

Optionally, the valve member is released from said fixed position prior to re-orientating the bottle towards an upright position.

Further features and advantages of the first and second aspects of the present invention will become apparent from the claims and the following description. Embodiments of the present invention will now be described by way of example only, with reference to the following diagrams, in which:—

Figure 1:
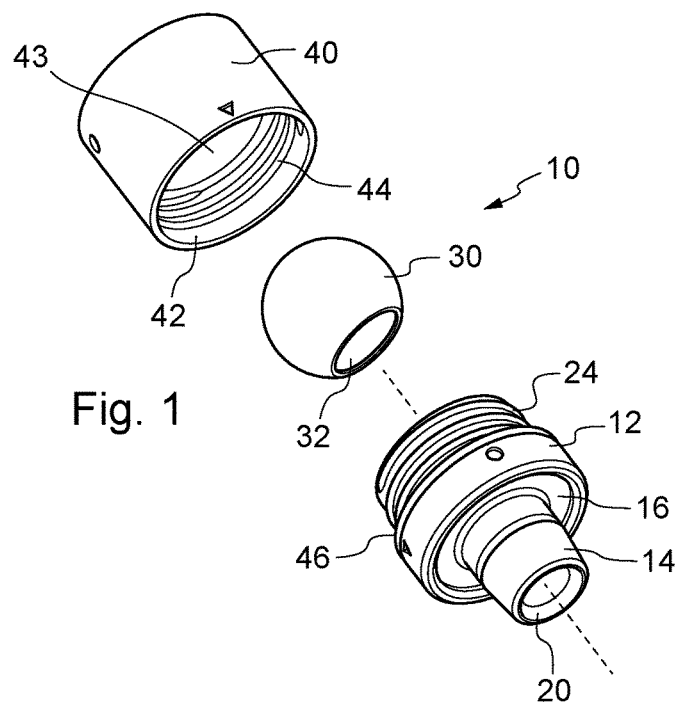
FIG. 1 is an exploded view of the bottle closure assembly according to the present invention.
Figure 2:
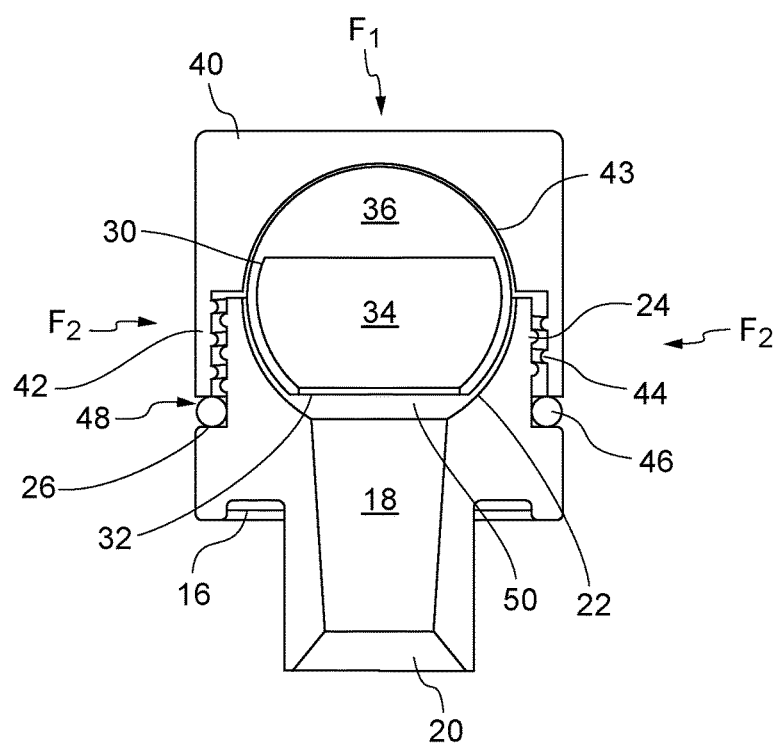
FIG. 2 is a sectional view through the bottle closure assembly of FIG. 1 when in its assembled form.

FIG. 1 shows a bottle closure assembly 10 comprising a stopper 12. The stopper 12 is provided with a spigot 14 for sealingly engaging within the finish and/or neck portion(s) of a bottle 100 as shown in, for example, FIGS. 4 and 5. As best shown in FIG. 2, the spigot 14 is shaped externally to facilitate its sealing engagement into the neck of a bottle 100. The widest part of the stopper 12 is provided with a downwardly facing annular recess 16 shaped and dimensioned to sealingly engage over the lip 102 of a bottle 100.

A passage 18 extends longitudinally through the interior of the stopper 12 and terminates at its "wine-side" (i.e. the end nearest the wine within a bottle) in an opening 20. At its uppermost extent (as viewed in FIG. 2), the tapered inner walls of the passage 18 transition into a widened opening 22 which curves both circumferentially and longitudinally to define a part-spherical inner surface shape.

A part-spherical valve member 30 is provided with an opening 32 to define a hollow receptacle 34 for collecting and retaining a sediment as is explained in more detail below. As best shown in FIG. 2, the valve member 30 is only partially hollow and is provided with an eccentrically positioned solid portion which defines a counterweight 36. For example, in some embodiments, the valve member 30 is formed from a moulded piece of polypropylene and provided with an eccentrically located stainless steel weight.

The valve member 30 may be seated on the widened opening 22 of the stopper 12 and encapsulated by a generally U-shaped (in section) cap member 40 of the bottle closure assembly 10. The cap member 40 has a part-spherical inner surface and a downwardly extending annular collar 42 thereof is provided with helical screw threads 44 for engaging complimentary screw threads 24 provided externally of the stopper 12 about its widened opening 22. A shoulder surface 26 of the stopper 12 extends radially away from passage 18 at a longitudinal position beneath its screw threads 24 as shown in FIG. 2. A resiliently deformable gasket 46 is held captive within an annular recess 48 defined by: (i) the upper shoulder surface 26; (ii) the underside of the downwardly extending annular collar 42; and (iii) an external cylindrical surface of the stopper 12 located beneath its external screw threads 24.

An inner surface 43 of the cap member 40 also curves both circumferentially and longitudinally to define a part-spherical inner surface shape which—when the cap member 40 is screw-mounted onto the stopper 12—complements that of the widened opening 22 of the stopper 12. An enlarged chamber 50 having a substantially truncated spherical volume is therefore defined by the respective inner facing surfaces of the stopper 12 and the cap member 40 respectively. As is explained in more detail below, the internal volume of the enlarged chamber 50 is variable by a de minimis amount to selectively permit or prevent rotation of the valve member 30 relative thereto.

Figure 3:
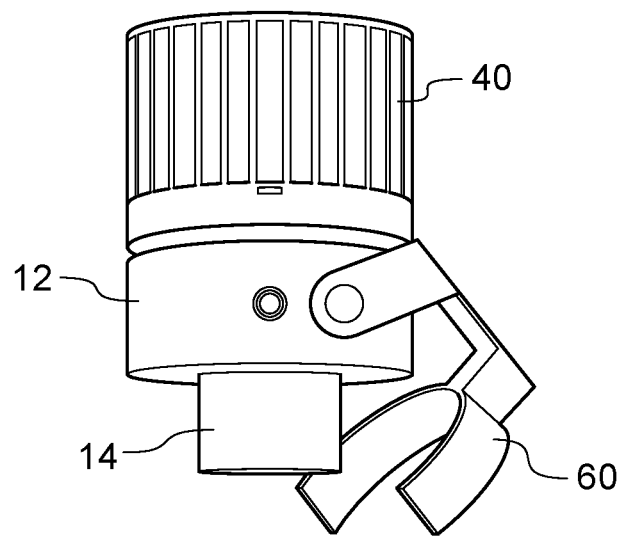
FIG. 3 shows an embodiment of the bottle closure assembly comprising a clamp mechanism.
Figure 4:
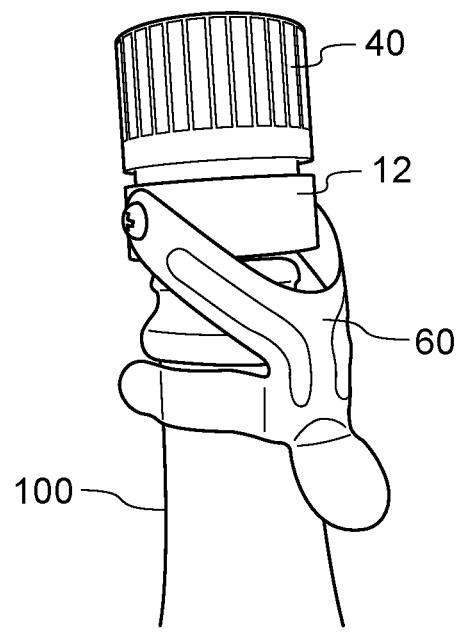
FIG. 4 shows the bottle closure assembly of FIG. 3 secured within the neck of a bottle, and clamped externally thereto.
Figure 5:
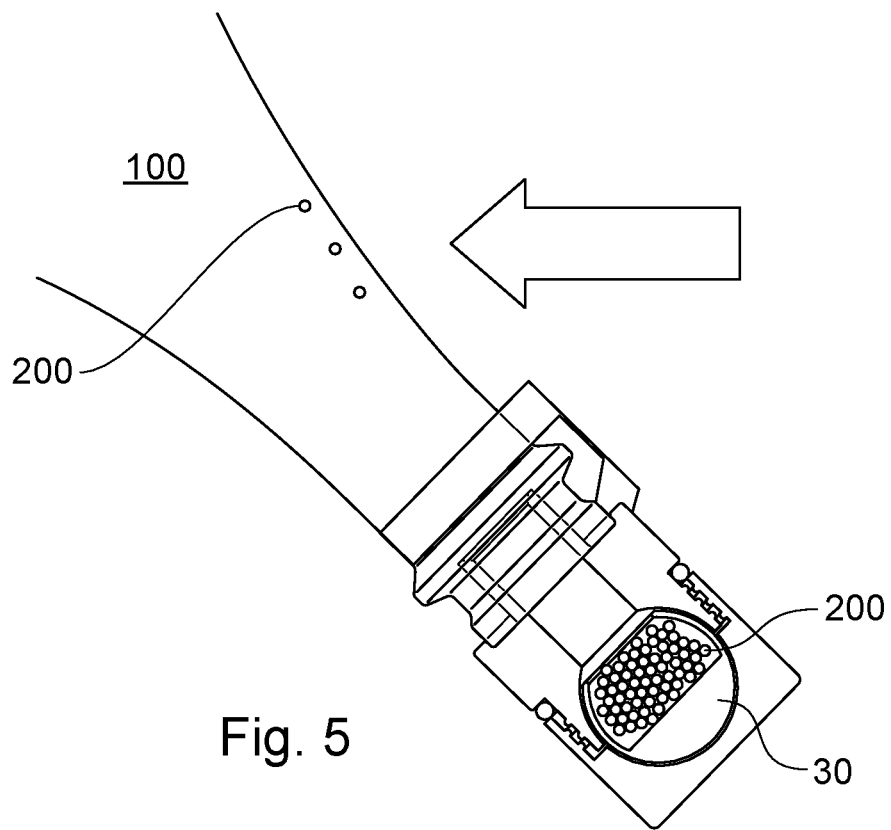
FIG. 5 is a representation of the descent of sediment (principally lees) and its collection within the interior of the valve of the bottle closure assembly when the bottle is maintained in a partially inverted orientation.

In use, the bottle closure assembly 10 as shown in FIG. 3 is attached to a bottle 100 already filled with "liqueur de tirage" by inserting its spigot 14 into the finish and/or neck portion(s) thereof as shown in FIG. 4. A clamp member 60 may be pivotally attached to the stopper 12 to provide a secondary point of contact on the neck of the bottle 100. Over a period of time, secondary fermentation occurs within the bottle 100 which creates carbon dioxide, thus carbonating the wine therein. During the secondary fermentation process, autolysis occurs whereby yeast within the liqueur de tirage dies and settles as a sediment, principally containing lees, against an internal wall of the bottle 100. Following a period of aging, the bottle 100 is moved to a rack whereby it is held at a partially inverted angle as shown in FIG. 5. Whilst so inverted, the bottle undergoes a riddling process whereby it is incrementally tilted and rotated over a period of time to move the sediment (principally lees) out of the bottle 100 and into the bottle closure assembly 10, thereby clarifying the remaining wine. The collected sediment (principally lees) is isolated within the bottle closure assembly 10 without any wastage of wine and with minimal pressure loss. The bottle closure assembly 10 facilitates a subsequent controlled release of pressurised carbon dioxide within the bottle following which the bottle closure assembly 10 containing the sediment (principally lees) can thereafter be removed, emptied, cleaned, and re-used. Finally, the clarified wine is dosed with a mixture of wine and/or sugar (and/or another spirit or liqueur) and can be capped or corked, wired and labelled ready for distribution and sale.

Referring again to FIG. 5, this shows the sediment 200 (principally lees) descending towards the neck of the bottle 100 and the bottle closure assembly 10 under the influence of gravity; and with assistance from the aforementioned riddling process. The sediment (principally lees) enters the wine-side opening 20 of the spigot 14 and travels down through the internal passage 18 of the stopper towards the valve member 30. Importantly, prior to the bottle 100 being inverted, the part-spherical valve member 30 is secured against rotation relative to the stopper 12 such that the opening 32 within the valve member 30 is maintained in alignment with the longitudinal axis of the passage 18. The diameter of the opening 32 is substantially matched to the diameter of the internal passage 18 when both are in alignment. Accordingly, this allows the sediment 200 (principally lees) to pass unimpeded into the hollow receptacle 34 within the valve member 30 once the bottle 100 is subsequently inverted.

The part-spherical valve member 30 is secured against rotation relative to the stopper 12 via the application of a downwardly directed force (F1) applied to it via the cap member 40. In practice, the extent of the inwardly directed force (F1) applied to the valve member 30 is dictated by the rotational position of the cap member 40 on the stopper 12. More specifically, as the screw threads 44 of the cap member 40 (as shown in FIG. 2) are tightened into the screw threads 24 of the stopper 12, the cap member moves downwardly until its inner part-spherical surface engages with the corresponding part-spherical surface of the valve member 30. The consequent downwardly directed force (F1) is sufficient to reduce the overall internal volume of the enlarged chamber 50. In view of the relatively small tolerances involved, a de minimis reduction of the internal volume of the enlarged chamber 50 is sufficient to cause a frictional engagement with the corresponding part-spherical surface of the valve member 30, thus preventing rotation of valve member 30 relative to the enlarged chamber 50.

In an alternative embodiment, the part-spherical valve member 30 may be secured against rotation relative to the stopper 12 via the application of a radially inwardly directed force (F2) applied to the external walls of the stopper 12. In practice, the extent of the inwardly directed force (F2) applied to the external walls of the stopper 12 may be dictated by the rotational position of the cap member 40 on the stopper 12. More specifically, as the screw threads 44 of the cap member 40 are tightened into the screw threads 24 of the stopper 12, the gasket 46 is deformed within its annular recess 48. The consequent increase of diameter of the gasket 46 (in the radial direction of the stopper 12) applies a radially inwardly directed force (F2) which is sufficient to reduce the diameter of the widened opening 22 of the internal passage 18, and hence reduce the overall internal volume of the enlarged chamber 50. In view of the relatively small tolerances involved, a de minimis inward movement of the part-spherical walls of the widened opening 22 cause a corresponding de mimimis reduction of the internal volume of the enlarged chamber 50 which is sufficient to cause a frictional engagement preventing rotation of valve member 30 relative to the enlarged chamber 50.

Once the riddling process is complete and substantially all sediment (principally lees) has been collected within the hollow receptacle 34 within the valve member 30, the screw threads 44 of the cap member 40 are partially loosened relative to the screw threads 24 of the stopper, thus partially reversing the frictional engagement described in the above alternative embodiments. In doing so, the forces (F1) or (F2) are at least partially removed; and hence the overall internal volume of the enlarged chamber 50 partially recovers. The de minimis increase of the internal volume of the enlarged chamber 50 is sufficient to remove the instances of frictional engagement with the corresponding part-spherical surface of the valve member 30.

Figure 6:
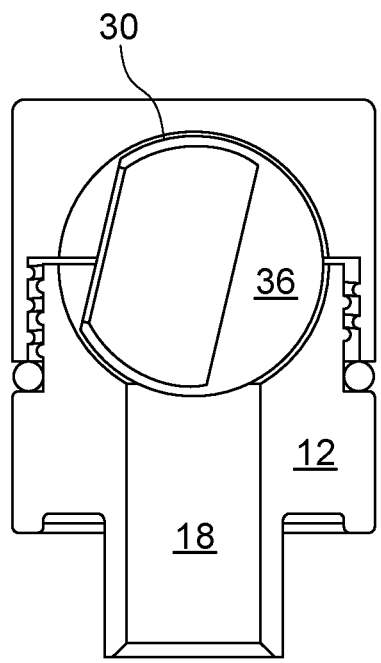
FIG. 6 is a representation of the valve member of the bottle closure assembly in an intermediate—partially rotated—position as it self-rights under the influence of gravity.

As soon as the forces (F1) or (F2) are at least partially removed, a de minimis amount of wine is introduced into the interface between walls of the enlarged chamber 50 and part-spherical the valve member 30. This thin-film of liquid acts as a lubricant and provides buoyancy to the valve member 30 thus facilitating its relative rotation (from the position shown in FIG. 5) in the clockwise direction under the influence of its counterweight 36 and gravity. It will be appreciated that the direction of rotation will be dictated by the orientation of the bottle and the corresponding relative position of the counterweight 36. As the bottle 100 is rotated counter-clockwise to resume its upright orientation, the valve member 30 rotates a full 180 degrees until it reaches the position shown in FIG. 7. For context only, an intermediate position of the valve member 30 is represented in FIG. 6.

Figure 7:
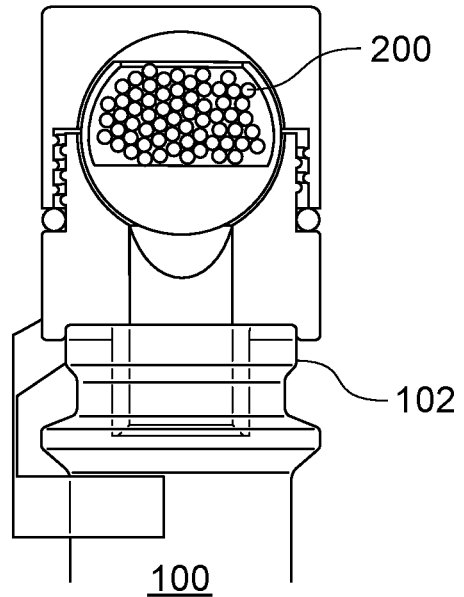
FIG. 7 shows the valve member of FIG. 5 following a 180 degree rotation relative to the stopper to thereby isolate the collected sediment (principally lees) from the contents of the bottle.
Figure 8:
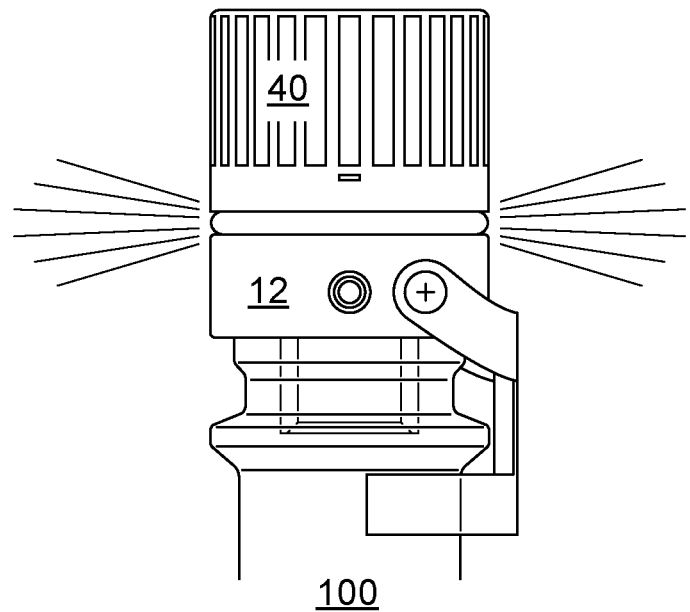
FIG. 8 shows the controlled release of carbon dioxide gas from the bottle.
Figure 9:
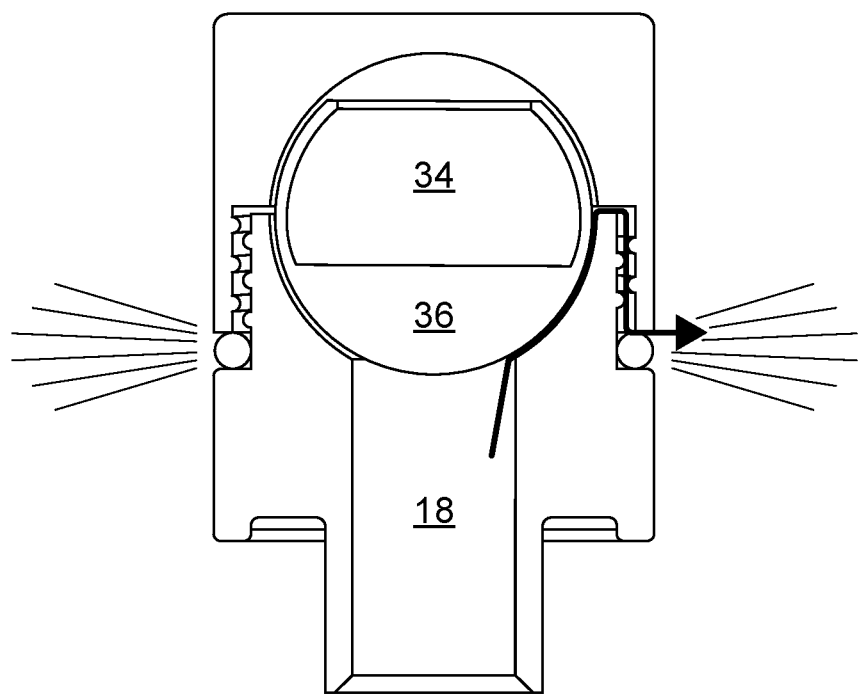
FIG. 9 is a sectional view through the bottle closure assembly of FIG. 8 showing the escape path of the carbon dioxide gas.

Once the valve member 30 is orientated as shown in FIG. 7, the sediment (principally lees) within its hollow receptacle 34 is isolated from the wine within the bottle 100. The subsequent release of pressurised carbon dioxide from within the bottle 100 is achieved by a further loosening of the cap member 40 relative to the stopper 12. In doing so, the deformation of the gasket 46 within the annular recess 48 is fully reversed and the radially inwardly directed force (F1) is fully removed. The consequent further increase in the diameter of the widened opening 22 of the internal passage 18 allows pressurised carbon dioxide gas to escape in a controlled fashion as indicated in FIG. 8, via the flow path shown in FIG. 9.

It will be appreciated that the structure and function of the bottle closure assembly 10 according to the present invention allows carbon dioxide pressure within the bottle 100 to be relieved independently of the sediment (principally lees). This represents a major improvement to the traditional method sparkling wine manufacturing process by obviating the need to freeze the neck of the bottle and facilitating a cleaner, safer, and more controlled disgorgement process which avoids wastage and hence increases yields.

Although particular embodiments of the invention have been disclosed herein in detail, this has been done by way of example and for the purposes of illustration only. The aforementioned embodiments are not intended to be limiting with respect to the scope of the appended claims. Indeed, it is contemplated by the inventors that various substitutions, alterations, and modifications may be made to the invention without departing from the scope of the invention as defined by the claims. By way of example only, although the described and illustrated embodiments show a part-spherical valve member 30 which is capable of freely rotating within the enlarged chamber, the valve member could instead be provided as a cylindrical shape which rotates about a single axis.

The invention claimed is:

1. A bottle closure assembly for use in efficient production of sparkling wines comprising:
   (i) a stopper for sealing engagement within a finish and/or neck portion(s) of a bottle;
   (ii) a passage within said stopper extending longitudinally from a wine-side opening at one end thereof; and
   (iii) a valve member located within said passage;
   wherein the valve member is selectively gravity-responsive thus allowing passage of liquid and/or solid and/or gaseous materials to be permitted or prevented dependent upon the orientation of the bottle closure assembly, and wherein the valve member is eccentrically weighted and is rotatable relative to the passage.

2. A bottle closure assembly according to claim 1, wherein the passage comprises an enlarged chamber.

3. A bottle closure assembly according to claim 2, wherein the valve member is located within said enlarged chamber remote from said wine-side opening.

4. A bottle closure assembly according to claim 1, wherein the valve member is at least partially hollow.

5. A bottle closure assembly according to claim 1, wherein the valve member has an exterior surface which is part-spherical.

6. A bottle closure assembly according to claim 5, wherein the part-spherical valve member is provided with an opening for permitting or preventing passage of liquid and/or solid and/or gaseous materials into its interior.

7. A bottle closure assembly according to claim 6, wherein the opening has a diameter which is less than the maximum diameter of the part-spherical valve member.

8. A bottle closure assembly according to claim 5, wherein the enlarged chamber is substantially spherical in volume and dimensioned such that its internal diameter substantially matches the maximum external diameter of the part-spherical valve member.

9. A bottle closure assembly according to claim 5, wherein the part-spherical valve member is seatable against internal walls of the enlarged chamber.

10. A bottle closure assembly according to claim 2, wherein the enlarged chamber is defined, in part, by a cylindrical cap member mounted onto the stopper.

11. A bottle closure assembly according to claim 10, wherein an inner surface of the cap member is capable of being moved into, and out of, engagement with the valve member to facilitate said selective rotation relative to the enlarged chamber.

12. A bottle closure assembly according to claim 9, wherein the internal walls are at least partially deformable to selectively engage and disengage the part-spherical valve member to thus respectively prevent or permit its rotation relative to the internal walls of the enlarged chamber.

13. A bottle closure assembly according to claim 1, wherein a resiliently deformable gasket is mountable upon an upper shoulder surface of the stopper.

14. A bottle closure assembly according to claim 10, wherein a downwardly extending annular collar of the cap member is provided with screw-threads engageable with complimentary screw-threads provided on the stopper to facilitate the cap member to be rotationally secured to the stopper.

15. A bottle closure assembly according to claim 13, wherein the resiliently deformable gasket is locatable within an annular recess on the bottle closure defined by:
(i) the upper shoulder surface;
(ii) the underside of a downwardly extending annular collar of the cap member; and
(iii) an external cylindrical surface of the stopper.

16. A disgorgement method for use in the production of sparkling wines, the method comprising:
(i) providing said bottle closure assembly according to claim 1;
(ii) inserting said bottle closure assembly into the neck and/or finish portions(s) of a bottle containing ingredients necessary for initiating secondary fermentation;
(iii) riddling the bottle whilst it is at least partially inverted;
(iv) collecting the sediment produced during secondary fermentation within the valve member located within said bottle closure assembly; and
(v) re-orientating the bottle towards an upright position and causing the gravity-responsive valve member to rotate relative to said bottle under the influence of gravity and, in so doing, isolate said sediment within the bottle closure assembly for ease of removal.

17. A disgorgement method according to claim 16, wherein the insertion of the bottle closure assembly to the finish and/or neck portion(s) of the bottle includes engaging it with the exterior neck portion thereof via a clamping member.

18. A disgorgement method according to claim 16, wherein the valve member is held in a fixed position relative to the stopper during at least riddling of the bottle and collection of the sediment.

19. A disgorgement method according to claim 16, wherein the valve member is released from said fixed position prior to re-orientating the bottle towards said upright position.

* * * * *